United States Patent
Easter

(10) Patent No.: US 6,491,849 B1
(45) Date of Patent: *Dec. 10, 2002

(54) HIGH PERFORMANCE POWER CABLE SHIELD

(75) Inventor: Mark R. Easter, Indianapolis, IN (US)

(73) Assignee: General Cable Technologies Corp., Highland Heights, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/765,297

(22) Filed: Jan. 22, 2001

(51) Int. Cl.$^7$ ................................................. H01B 1/24
(52) U.S. Cl. ............................... 252/511; 174/102 SC; 174/105 SC
(58) Field of Search .................. 252/511; 174/102 SC, 174/105 SC

(56) References Cited

U.S. PATENT DOCUMENTS

| | | | |
|---|---|---|---|
| 3,182,101 A | * | 5/1965 | Rees et al. ................. 260/885 |
| 3,849,333 A | | 11/1974 | Lloyd et al. |
| 4,102,855 A | * | 7/1978 | Kuan et al. ............... 260/42.33 |
| 4,305,849 A | | 12/1981 | Kawasaki et al. |
| 4,612,139 A | | 9/1986 | Kawasaki et al. |
| 4,857,232 A | | 8/1989 | Burns, Jr. |
| 4,933,107 A | * | 6/1990 | Watanbe et al. ............. 252/511 |
| 5,889,117 A | | 3/1999 | Flenniken |
| 6,086,792 A | | 7/2000 | Reid et al. |
| 6,274,066 B1 | * | 8/2001 | Easter ........................ 252/511 |

* cited by examiner

Primary Examiner—Mark Kopec
(74) Attorney, Agent, or Firm—Blank Rome Comiskey & McCauley

(57) ABSTRACT

An improved conductor shielding composition for power cables is disclosed. The composition includes a base polymer, conductive carbon black and a waxy additive. Cable shields prepared from the composition exhibit improved aging performance in accelerated cable life tests (ACLT).

22 Claims, No Drawings

HIGH PERFORMANCE POWER CABLE SHIELD

BACKGROUND OF THE INVENTION

1. Technical Field of the Invention

This invention relates to compositions useful in the preparation of semiconductive conductor shields in power cables and to semiconductive conductor shields and power cables utilizing the composition.

2. Description of the Related Art

A typical insulated electric power cable generally comprises a conductor in a cable core that is surrounded by several layers of polymeric materials including an inner semiconducting shield layer (conductor or strand shield), an insulating layer, an outer semiconducting shield layer (insulation shield), a metallic wire or tape shield used as the ground phase, and a protective jacket. Additional layers within this construction such as moisture impervious materials, are often incorporated. The invention pertains to the inner semiconducting shield layer, i.e., the conductor shield.

Semiconductive shields have been used in power cables as shields for the cable conductor and insulation for many years. The conductor shield is typically extruded over the cable conductor to provide a layer of intermediate conductivity between the conductor and cable insulation in the power cable. Conventional compositions for these conductor shields include a base polymer as the predominant component of the composition compounded with, carbon black to provide conductivity for the composition and various additives.

The primary purpose of the semiconducting conductor shield between the conductor and insulation in an electrical power cable is to ensure the long term viability of the primary insulation. There is always a need for improved semiconductive conductor shield compositions that balance cost and performance.

Examples of polymer compositions used as shields in power cables are found in the disclosures of U.S. Pat. Nos. 4,612,139 and 4,305,846 to Kawasaki et al., U.S. Pat. No. 4,857,232 to Burns, Jr., U.S. Pat. No. 3,849,333 to Lloyd et al., U.S. Pat. No. 5,889,117 to Flenniken, and U.S. Pat. No. 6,086,792 to Reid et al., the disclosures of which are hereby incorporated by reference.

It would be desirable to have a conductor shield material with improved performance that does not require the use of expensive additives, complex polymer formulations, or specially prepared carbon black, as performance must always be balanced with cost in the manufacture of electric cable.

SUMMARY OF THE INVENTION

The invention provides a conductor shield material with improved performance without the need for expensive additives, complex polymer formulations, or specially prepared carbon black.

In particular, the composition of the invention, conductor shields and cables made with conductor shields in accordance with the invention exhibit superior performance over time as demonstrated by accelerated cable life testing (ACLT) as compared to conventional high performance conductor shield compositions.

In particular, the invention provides a conductor shield comprising a base polymer selected from the group consisting of copolymers of ethylene and a mono-unsaturated ester, copolymers of ethylene and one or more alpha olefins having three to six carbon atoms, EPR and EDPM rubbers, low density polyethylene and linear low density polyethylene; conductive carbon black; and a waxy additive selected from the group consisting of at least one amide wax, at least one ethylene vinyl acetate wax and mixtures of at least one amide wax and at least one ethylene vinyl acetate wax.

The invention also provides a conductor shield consisting essentially of a base polymer selected from the group consisting of copolymers of ethylene and a mono-unsaturated ester, copolymers of ethylene and one or more alpha olefins having three to six carbon atoms, EPR and EDPM rubbers, low density polyethylene and linear low density polyethylene; conductive carbon black; and a waxy additive selected from the group consisting of at least one amide wax, at least one ethylene vinyl acetate wax and mixtures of at least one amide wax and at least one ethylene vinyl acetate wax.

In addition to the composition matter, the invention includes a semiconductive shield for the conductor or insulation in a power cable formed by extruding the composition over the conductor or insulation of the power cable and the resulting power cable that employs the composition as a conductor shield.

DETAILED DESCRIPTION OF THE PREFERRED EMBODIMENT

The base polymer of the composition of the invention can be selected from a variety of polymers including various homopolymers, copolymers and terpolymers known in the art, the selection being based upon the ultimate desired use of the polymer composition. For example, the polymers used in the polymeric compositions of the present invention may include, but are not limited to, homopolymers, copolymers and graft polymers of ethylene where the co-monomers are selected from butene, hexene, vinyl acetate, acrylic acid, methacrylic acid, esters of acrylic acid, esters of methacrylic acid, maleic anhydride, half esters of maleic anhydride, carbon monoxide and the like; elastomers selected from natural rubber, polybutadiene, polyisoprene, random styrene butadiene rubber, polychloroprene, nitrile rubbers, ethylene propylene copolymers and terpolymers and the like; homopolymers and copolymers of styrene, including styrene-butadiene, styrene-butadiene-styrene linear and radial polymers, acrylonitrile-butadiene-styrene, styrene acrylonitrile and the like; linear and branched polyether or polyester polyols; crystalline and amorphous polyesters and polyamides; alkyd resins, rosin acids or rosin esters; hydrocarbon resins produced from thermal or Friedal Crafts polymerization of cyclic diene monomers such as dicyclopentadiene, indene, cumene and the like; ethylene/silane copolymers; ethylene/.alpha.-olefin/diene terpolymers such as ethylene/propylene/1,4-hexadiene, ethylene/1-butene/1,4-hexadiene and the like; mixtures thereof and the like. Additionally, the polymer used in compositions of the present invention may include copolymers and terpolymers containing the above-identified polymers as major components of the copolymer or terpolymer.

Preferably, the base polymer of the composition of the invention is selected from a variety of polymers including copolymers of ethylene and a mono-unsaturated ester such as ethylene-ethyl acrylate, ethylene-methyl acrylate, ethylene-methyl methacrylate and ethylene-vinyl acetate, copolymers of ethylene and one or more alpha olefins having three to six carbon atoms, as well as EPR and EDPM rubbers, low density polyethylene (LDPE) and linear low density polyethylene (LLDPE). Of these copolymers, ethylene-vinyl acetate (EVA) is more preferred. More particularly, EVA having a vinyl acetate content between 18 and 20% is most preferred for use as the base polymer of the invention. The base polymer of the composition of the invention is present in amounts from about 30% to about 99.4% by weight, based upon the weight of the of the total composition.

In the present invention, commercially available, conventional carbon black is added to the polymer compositions to impart semi-conductive properties to the composition. The ability to use such commercially available, conventional carbon blacks to achieve improved ACLT results is an advantage of the invention. The carbon black added to the polymer may be one of the various available conventional carbon blacks, including finely divided carbon such as lamp black, furnace black, or acetylene black, i.e. carbon black made by pyrolyzing acetylene. Ketjin black may be used in the compositions of the invention as well as many of the commercial carbon black grades described in ASTM D 1765 98b, for example, N351, N293 and N550. Preferably, to avoid problems associated with carbon black dust, the carbon black is pelletized, although non-pelletized carbon black, such as in its fluffy form, may also be used with equal success. The carbon black is generally present in the composition in the amount of from about 0.1% to about 65% by weight of the polymer composition. Preferably the carbon black is present in an amount of from about 10% to about 50% by weight, based on the weight of the total composition.

A tremendous number of compounds have been suggested for use as additives in semiconducting shield compositions. Typically, these compounds fall into the category of antioxidants, curing agents, vulcanizing agents, crosslinking agents, boosters and retardants, processing aids, pigments, dyes, colorants, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators.

The present invention is based upon the discovery that certain polar waxes produce a shield composition having enhanced electrical aging performance as measured by accelerated cable life testing (ACLT). The polar waxes of the invention, i.e., the waxy additive, are selected from the group consisting of at least one amide wax, at least one ethylene vinyl acetate wax and mixtures of at least one amide wax and at least one ethylene vinyl acetate wax. In embodiments of the invention the amide wax is selected from stearamide, oleamide, erucamide, ethylene bis-stearamide, ethylene bis-oleamide, ethylene bis-erucamide and mixtures thereof. Oleamide and erucamide are preferred. Oleamide is commercially available from Croda Universal, Inc. under the designation CRODAMIDE OR® and euracamide is commercially available from Croda Universal, Inc. under the designation CRODAMIDE ER®. In other embodiments of the invention, the waxy additive is an ethylene vinyl acetate (EVA) wax and has a molecular weight from about 15,000 Daltons to about 40,000 Daltons and a vinyl acetate content of from about 2% to about 28%, preferably from about 10% to about 20%. In more preferred embodiments, the EVA wax has a molecular weight from about 15,000 Daltons to about 30,000 Daltons and a vinyl acetate content of from about 12% to about 15%. The waxy additive may be at least one amide wax, at least one EVA wax, or a mixture of at least one amide wax and at least one EVA wax. The waxy additive is from about 0.5% to about 5.0% by weight of the composition, preferably from about 0.8% to about 2.0% by weight of the composition.

Examples of antioxidants are as follows, but are not limited to: hindered phenols such as tetrakis[methylene(3, 5-di-tert-butyl-4-hydroxyhydro-cinnamate)] methane; bis [(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline (TMQ), n,n'-bis(1,4-dimethylpentyl-p-phenylenediamine), alkylated diphenylamines, 4,4'-bis (alpha, alpha-demthylbenzyl)diphenylamine, diphenyl-p-phenylenediamine, mixed di-aryl-p-phenylenediamines, and other hindered amine antidegradants or stabilizers. Antioxidants can be used in amounts of about 0.1 to about 5 percent by weight based on the weight of the composition.

Examples of curing/crosslinking agents are as follows: dicumyl peroxide; bis(alpha-t-butyl peroxyisopropyl) benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2, 5-dimethylhexyne-3; 1,1-bis(t-butylperoxy)3,3,5-trimethylcyclohexane; isopropylcumyl cumylperoxide; di(isopropylcumyl) peroxide; or mixtures thereof. Peroxide curing agents can be used in amounts of about 0.1 to 5 percent by weight based on the weight of the composition.

The polymer compositions of the present invention may be manufactured using conventional machinery and methods to produce the final polymer product. The compositions may be prepared by batch or continuous mixing processes such as those well known in the art. For example, equipment such as Banbury mixers, Buss cokneaders, and twin screw extruders may be used to mix the ingredients of the formulation. The components of the polymer compositions of the present invention may be mixed and formed into pellets for future use in manufacturing electrical cable.

The composition of the invention, and conductor shields and cables made with conductor shields in accordance with the invention exhibit superior performance over time as demonstrated by accelerated cable life testing (ACLT) as compared to conventional high performance conductor shield compositions. Specifically, as described below in the Example, the composition of the invention when used in a conductor shield has an accelerated cable life testing Weibull Beta value of 1.5 or more, preferably 3.0 or more. While the connection between smoothness of the conductor shield may or may not be related to the improved ACLT values, nonetheless, the composition of the invention when used in a conductor shield may achieve a count of surface imperfections/$m^2$ of 500 or less, preferably a count of surface imperfections/$m^2$ of 200 or less.

To further illustrate the advantageous features of the invention, the following non-limiting examples are provided.

EXAMPLE 1
Accelerating Cable Life Test (ACLT)

Two power cables were prepared. The cables had a 1/0 19 wire stranded aluminum conductor surrounded by 15 mils. of a conductor shield having a composition as specified in Table 1 (representing the parts by weight), surrounded by 175 mils of cross-linked polyethylene insulation (Union Carbide 4201) surrounded by 35 mils. of LS 567 semiconductive insulation shield (LS 567 is a product designation of General Cable). A Copper mesh was then wrapped around the insulation shield to provide the ground path for the shortout in the test. The conductor shield was extruded first and then the insulation and outer shield components were extruded over the conductor at one time on a Davis standard tandem extruder and dry cured under pressurized nitrogen in a continuous catenary vulcanization tube and water cooled. Table I provides the composition of the conductor shield in each of the two tested cables.

TABLE I

CONDUCTOR SHIELDING COMPOSITIONS TESTED

|  | Comparative Example | Example 1 |
|---|---|---|
| EVA (18–20% VA) | 60 | 59 |
| Acetylene black | 38 | 38 |
| TMQ | 1 | 1 |
| EVA wax | 0 | 2 |
| Dicumyl peroxide | 1 | 1 |

The EVA wax used had a MW of approximately 18,000 Daltons, an EVA content of 13%, and is sold by Honeywell Corporation of Morristown, N.J. under the designation AC400. The EVA base resin used is available from E. I. DuPont de Nemours of Wilmington, Del. under the designation ELVAX 450. The acetylene black used is available from Denka Denki Kagaku Kogyo of Tokyo, Japan under the designation Denka Granule. The TMQ used is available from RT Vanderbilt Company, Inc. of Norwalk, Conn. under the designation Agerite Resin D.

A commercially available power cable stated to contained ethylene-vinyl acetate and acetylene black by the manufacturer was also tested.

The two test cable specimens and commercial cable were subjected to accelerated cable life testing (ACLT) using the following protocol:

Five samples of the Comparative Example cable and nine samples of cable made according to the invention (Example 1) were prepared for the test. Samples were preconditioned for 72 hours at 90° conductor temperature in free air. The center of each sample was immersed in 50° water. The cable conductor temperature in the water was controlled to 75° for 8 hours each 24 hour period. For the remaining 16 hours, the heating current was turned off. The samples were energized at four times normal voltage stress (34.6 kv) until all test samples failed.

The failure times were analyzed using extreme value distribution statistics (Weibull) to assess comparative mean life equivalency or enhancements versus control(s). For the Weibull distribution, the distribution parameters are ETA ($\alpha$), the scale parameter and data ($\beta$), the shape parameter. The scale parameter measures the relative scope or largeness of the variable in question (life in days) while the shape parameters measures the variation (or range min. to max.) in the individual data (failure times) results of the population is sample. Both parameters of the test population best fit distribution were compared to a controlled population.

The Uninop count of surface imperfections per square meter was 1064 for the Comparative Example and 176 for Example 1.

The test results in days to failure for the Comparative Example were 34, 44, 78, 172 and 232. The test results in days to failure for Example 1 were 73, 80, 89, 93, 103, 141, 171, 183 and 184.

The Weibull alpha and beta values for Example 1 in accordance with the invention were 129 days and 3.35, respectively. The Weibull alpha and beta values for the Comparative Example 125 days and 1.30 respectively. A Beta value of approximately 1.0 represents random failure. Beta values that are greater than 1.5 represent the wear out mode of failure (as opposed to random) which means the finite life of the cable is improved and more predictable as the beta value increases.

The cable of the invention is clearly superior in reliability based on the Weibull beta data and also shows improved smoothness of the conductor shield layer.

What is claimed is:

1. A conductor shield composition comprising:
    a base polymer selected from the group consisting of copolymers of ethylene and a mono-unsaturated ester, copolymers of ethylene and one or more alpha olefins having three to six carbon atoms, EPR rubbers, low density polyethylene and linear low density polyethylene;
    conductive carbon black; and
    a waxy additive different from said base polymer selected from the group consisting of at least one amide wax, at least one ethylene vinyl acetate wax and mixtures of at least one amide wax and at least one ethylene vinyl acetate wax.
2. The composition of claim 1, wherein said at least one amide wax is selected from stearamide, oleamide, erucamide, ethylene bis-stearamide, ethylene bis-oleamide, ethylene bis-erucamide and mixtures thereof.
3. The composition of claim 1, wherein said at least one EVA wax has a molecular weight from about 15,000 Daltons to about 40,000 Daltons and a vinyl acetate content of from about 2% to about 28%.
4. The composition of claim 1, wherein said at least one EVA wax has a vinyl acetate content of from about 10% to about 20%.
5. The composition of claim 1, wherein said waxy additive is from about 0.5% to about 5.0% by weight of the composition.
6. The composition of claim 5, wherein said base polymer is a copolymer of ethylene and vinyl acetate.
7. The composition of claim 6, wherein said base polymer has a vinyl acetate content between 18% and 20%.
8. The composition of claim 1 having an accelerated cable life testing Weibull Beta value of 1.5 or more.
9. The composition of claim 8, Wherein said at least one EVA wax has a molecular weight from about 15,000 Daltons to about 30,000 Daltons and a vinyl acetate content of from about 12% to about 15%.
10. The composition of claim 1 wherein said base polymer is selected from the group consisting of copolymers of ethylene and a mono-unsaturated ester, copolymers of ethylene and one or more alpha olefins having three to six carbon atoms, low density polyethylene and linear low density polyethylene.
11. A conductor shield composition consisting essentially of:
    a base polymer selected from the group consisting of copolymers of ethylene and a mono-unsaturated ester, copolymers of ethylene and one or more alpha olefins having three to six carbon atoms, EPR rubbers, low density polyethylene and linear low density polyethylene;
    conductive carbon black; and a waxy additive different from said base polymer selected from the group consisting of at least one amide wax, at least one ethylene vinyl acetate wax and mixtures of at least one amide wax and at least one ethylene vinyl acetate wax.

12. The composition of claim 11, wherein said at least one amide wax is selected from stearamide, oleamide, erucamide, ethylene bis-stearamide, ethylene bis-oleamide, ethylene bis-erucamide and mixtures thereof.

13. The composition of claim 11, wherein said at least one EVA wax has a molecular weight from about 15,000 Daltons to about 40,000 Daltons and a vinyl acetate content of from about 2% to about 28%.

14. The composition of claim 11, wherein said at least one EVA wax has a vinyl acetate content of from about 10% to about 20%.

15. The composition of claim 11, wherein said waxy additive is from about 0.5% to about 5.0% by weight of the composition.

16. The composition of claim 15, wherein said base polymer is a copolymer of ethylene and vinyl acetate.

17. The composition of claim 16, wherein said base polymer has a vinyl acetate content between 18% and 20%.

18. The composition of claim 11 having an accelerated cable life testing Weibull Beta value of 1.5 or more.

19. The composition of claim 18, wherein said at least one EVA wax has a molecular weight from about 15,000 Daltons to about 30,000 Daltons and a vinyl acetate content of from about 12% to about 15%.

20. The composition of claim 11 having a count of surface imperfections/$m^2$ of 500 or less.

21. The composition of claim 11 having a count of surface imperfections/$m^2$ of 200 or less.

22. The composition of claim 11 wherein said base polymer is selected from the group consisting of copolymers of ethylene and a mono-unsaturated ester, copolymers of ethylene and one or more alpha olefins having three to six carbon atoms, low density polyethylene and linear low density polyethylene.

* * * * *